United States Patent
Mock et al.

(10) Patent No.: US 7,637,425 B2
(45) Date of Patent: Dec. 29, 2009

(54) METHOD AND SYSTEM FOR WIRELESS AND CREDIT CARD TRANSACTIONS

(75) Inventors: Von A. Mock, Boynton Beach, FL (US); Juan C. Fernandez, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 270 days.

(21) Appl. No.: 11/738,341

(22) Filed: Apr. 20, 2007

(65) Prior Publication Data

US 2008/0121696 A1 May 29, 2008

Related U.S. Application Data

(60) Provisional application No. 60/867,471, filed on Nov. 28, 2006.

(51) Int. Cl.
G06K 5/00 (2006.01)
G06K 7/01 (2006.01)

(52) U.S. Cl. ................. 235/380; 235/375; 235/382; 235/382.5; 235/451; 235/487; 235/492; 705/39; 705/44; 455/310; 455/311; 455/406; 455/558

(58) Field of Classification Search ............... 235/375, 235/380–383, 451, 487, 492; 705/39, 44; 455/310, 311, 406, 558
See application file for complete search history.

(56) References Cited

U.S. PATENT DOCUMENTS 6,029,892 A 2/2000 Miyake
(Continued)

FOREIGN PATENT DOCUMENTS

DE 192732762 A1 11/1998
(Continued)

OTHER PUBLICATIONS

Bank of America, "Mini Card", 2 pages article. http://www.bankofamerica.com/creditcards/index.cfm?template=cc_features_minicard&state=IT#top, web site last visited Apr. 20, 2007.
(Continued)

*Primary Examiner*—Thien M. Le
*Assistant Examiner*—Tuyen K Vo
(74) *Attorney, Agent, or Firm*—Pablo Meles; Akerman Senterfitt

(57) ABSTRACT

A method (10) and system (50 or 200) of using a credit card media type (54) integrated with a wireless communication device (52) can include determining (12) that the wireless communication device is inoperable for use in a commercial transaction and enabling (14) the use and authorization of the credit card media type with a predetermined restriction profile that is more restrictive than when the credit card media type is used with the wireless communication device when operable. The method can lower (16) the payment authorization amount or limit a type of item that is purchased to a predefined type based on a remote network being unable to communicate with the wireless communication device. The method can also remove (18) the credit card media type from the communication device and enable the use and authorization of the credit card media type with the predetermined restriction profile.

20 Claims, 3 Drawing Sheets

U.S. PATENT DOCUMENTS

| | | | |
|---|---|---|---|
| 6,115,601 A * | 9/2000 | Ferreira | 455/406 |
| 6,769,607 B1 * | 8/2004 | Pitroda et al. | 235/380 |
| 6,959,202 B2 | 10/2005 | Heinonen et al. | |
| 7,293,717 B1 * | 11/2007 | Pathmasuntharan et al. | 235/492 |
| 2001/0054148 A1 | 12/2001 | Hoornaert et al. | |
| 2002/0026423 A1 * | 2/2002 | Maritzen et al. | 705/56 |
| 2002/0107791 A1 * | 8/2002 | Nobrega et al. | 705/39 |

FOREIGN PATENT DOCUMENTS

FR          2787273 A       6/2000

OTHER PUBLICATIONS

Patent Cooperation Treaty, "International Search Report and Written Opinion", ISA/EP, by Officer Bart Wolles in PCT Application No. PCT/US2007/081107; Document of 10 pages dated May 8, 2008.

* cited by examiner

50

50

METHOD AND SYSTEM FOR WIRELESS AND CREDIT CARD TRANSACTIONS

CROSS REFERENCE TO RELATED APPLICATIONS

This application claims the benefit of U.S. Provisional Patent Application No. 60/867,471, filed Nov. 28, 2006, the entire contents of which are incorporated by reference herein.

FIELD

This invention relates wireless communication and financial networks, and more particularly to a method and system for defining credit card usage when used in conjunction with wireless communication devices.

BACKGROUND

A number of mobile device manufactures are integrating credit card capabilities within a phone or mobile device. However, in most cases, the credit card is not available when the mobile device is damaged or non-operational. No known integrated phone and credit card system appears to enable the credit card functionality when the phone or mobile device is inoperable.

Although someone can simply paste a credit card to a mobile device, this arrangement would not be considered a credit card that is integrated with the mobile device. An integrated phone and credit card system would include a code transmitted by the phone that would further authorize a credit card or some other type of financial transaction card. Some of these devices might also be known as electronic wallets that enable or effectuate payments.

SUMMARY

Embodiments in accordance with the present invention can provide an ability to disassociate or eject a credit card media type from a mobile device and use the credit card media type as a stand alone payment system. Further note, that the credit card media type in accordance with the embodiments herein does not necessarily need to be ejected or removed from the device, but can remain as part of the mobile or wireless device as long as a more restrictive authorization profile or amount is established as a result of being outside the phone or not being able to use the wireless device. In many instances the wireless device is used for biometric or other authentication purposes, yet a financial institution is more than likely willing to authorize usage of the card (to a limited extent) without such additional authentication steps. Thus, the embodiments herein can enable authorization for lowered payment amounts or for predefined goods or services notwithstanding an inoperable wireless device.

In a first embodiment of the present invention, a method of using a credit card media type integrated with a wireless communication device can include the steps of determining that the wireless communication device is inoperable for use in a commercial transaction and enabling the use and authorization of the credit card media type with a predetermined restriction profile that is more restrictive than when the credit card media type is used with the wireless communication device when operable. The predetermined restriction profile can be a profile defining the limitation of the use of a particular credit card media type for a particular user. The limitations can include an amount in terms of money or number of items, a type of item, or a time of day or day of the week a purchase can be made just as examples. The method can further include the step of lowering the payment authorization amount or limiting a type of item that is purchased to a predefined type based on a remote network being unable to communicate with the wireless communication device. The method can also remove the credit card media type from the wireless communication device and enable the use and authorization of the credit card media type with the predetermined restriction profile. A default card type can be defined when the credit card media is ejected from the wireless communication device or when a remote network is unable to communicate with the wireless communication device. A default card type can also be defined on a secure storage card stored within the wireless communication device.

In a second embodiment of the present invention, a system of managing a credit card media type integrated with a wireless communication device can include a wireless transceiver, a credit card media type, and a processor operatively coupled to the wireless transceiver and the credit card type. The processor can be programmed to determine when the wireless transceiver is inoperable for use in a commercial transaction and enable the use and authorization of the credit card media type with a more restrictive usage authorization than when the credit card media type is used in conjunction with an operable wireless communication device that can communicate with a wireless network. The processor can be further programmed to lower the payment authorization amount or to limit a type of item that is purchased to a predefined type based on a remote network being unable to communicate with the wireless communication device. The credit card media type can be removed from the wireless communication device and a default card type can be defined when the credit card media is ejected from the wireless communication device. A default card type can also be defined when a remote network is unable to communicate with the wireless communication device. The default card type can be defined on a secure storage card stored within the wireless communication device. Note, the wireless communication device can be a cellular phone, a smart phone, or a personal digital assistant or a laptop computer with wireless communication capabilities.

In a third embodiment of the present invention, a portable wireless communication device can include a wireless transceiver and a removable credit card media type integrated within the portable wireless communication device. The removable credit card media type can be authorized for financial transactions for a less restrictive authorization mode when the wireless transceiver communicates with a remote network and is authorized for a more restrictive mode when the wireless transceiver fails to communicate with the remote network. The portable wireless communication device can further include a processor operatively coupled to the wireless transceiver and the credit card type wherein the processor is programmed to determine when the wireless transceiver is inoperable for use in a commercial transaction and enable the use and authorization of the credit card media type with the more restrictive authorization mode when the wireless transceiver is determined inoperable. A default card type can be defined when the removable credit card media is ejected from the wireless communication device or when the remote network is unable to communicate with the wireless communication device. As noted above, the portable wireless communication device can be a cellular phone, a smart phone, or a personal digital assistant or a laptop computer with wireless communication capabilities.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "commercial transaction" or "financial transaction" can be any financial transaction among parties that can include a point of sale transaction or other process that takes place when a cardholder makes a purchase with a credit card media type. The term "inoperable" with respect to a wireless communication device should be understood as either being unable to perform a commercial transaction or unable to communicate with a communication network facilitating such transaction.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a midlet, a source code, an object code, a shared library/dynamic load library and/or other sequence of instructions designed for execution on a computer system. The "processor" as described herein can be any suitable component or combination of components, including any suitable hardware or software, that are capable of executing the processes described in relation to the inventive arrangements. A "credit card media type" or credit card media can be any financial card or media (e.g., credit card, debit card, credit wand, memory stick) enabling a financial transaction.

Other embodiments, when configured in accordance with the inventive arrangements disclosed herein, can include a system for performing and a machine readable storage for causing a machine to perform the various processes and methods disclosed herein.

DETAILED DESCRIPTION OF THE DRAWINGS

Figure 1:
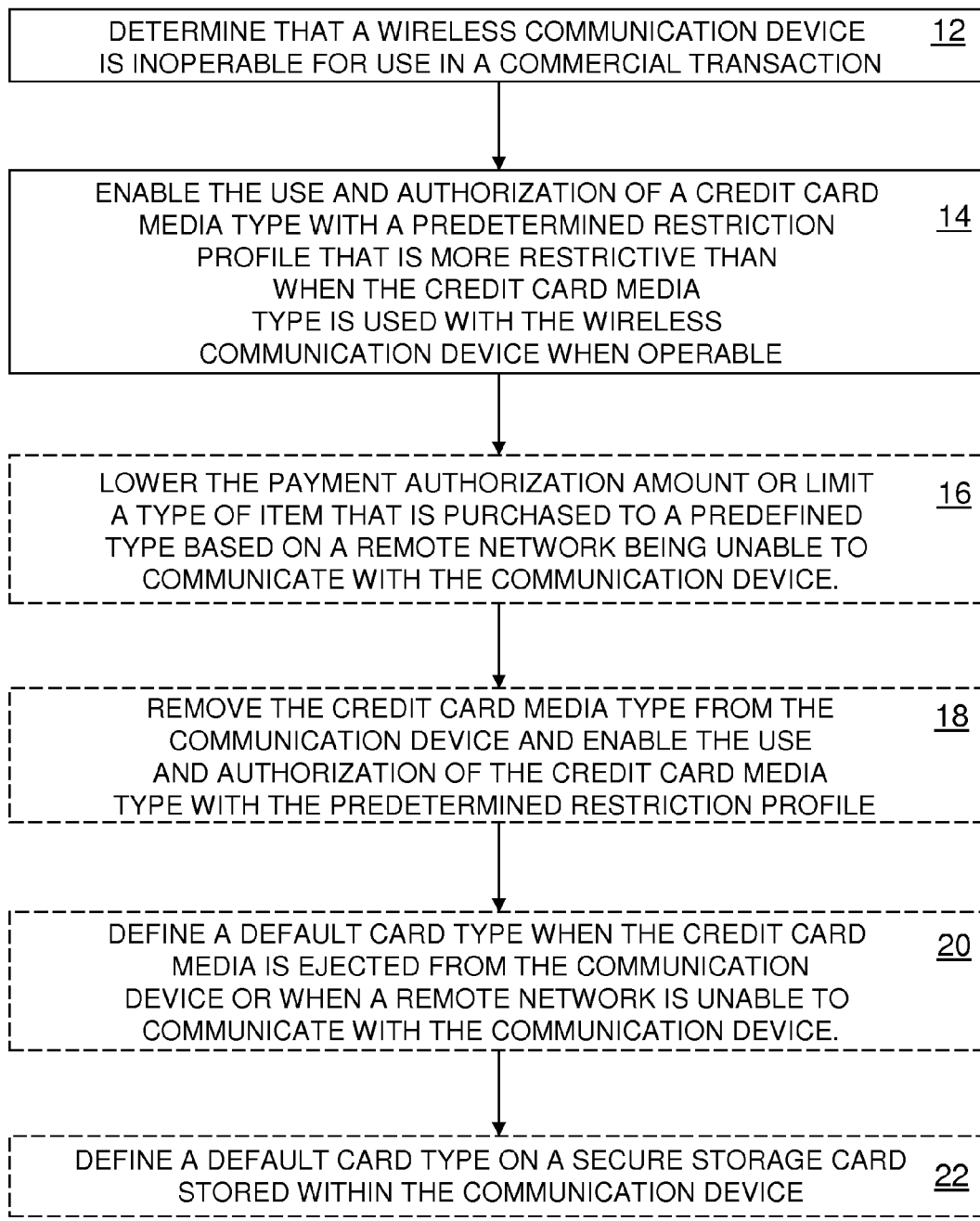
FIG. 1 is a flow chart of a method of using a credit card media type integrated with a wireless communication device in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Embodiments herein can be implemented in a wide variety of exemplary ways that can enable a user of an wireless communication device integrated with a credit card media type to continue using the credit card notwithstanding the operability of the wireless communication device or the connection of the credit card media type to the wireless communication device.

Referring to FIG. 1, a flow chart illustrating a method 10 of using a credit card media type integrated with a wireless communication device can include the step 12 of determining that the wireless communication device is inoperable for use in a commercial transaction and the step 14 of enabling the use and authorization of the credit card media type with a predetermined restriction profile that is more restrictive than when the credit card media type is used with the wireless communication device when operable. The method 10 can further include the step 16 of lowering the payment authorization amount or limiting a type of item that is purchased to a predefined type based on a remote network being unable to communicate with the wireless communication device. The method 10 can also remove the credit card media type from the wireless communication device and enable the use and authorization of the credit card media type with the predetermined restriction profile at step 18. A default card type can be optionally defined at step 20 when the credit card media is ejected from the wireless communication device or when a remote network is unable to communicate with the wireless communication device. A default card type can also be optionally defined at step 22 on a secure storage card stored within the wireless communication device.

Figure 2:
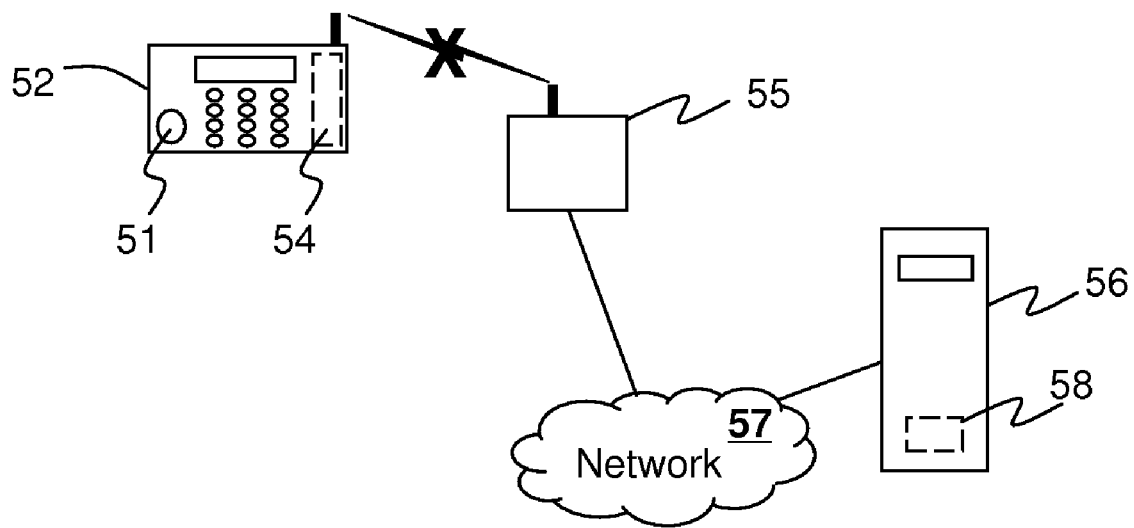
FIG. 2 is an block diagram of a system using a credit card media type integrated with a wireless communication device in accordance with an embodiment of the present invention.
Figure 3:
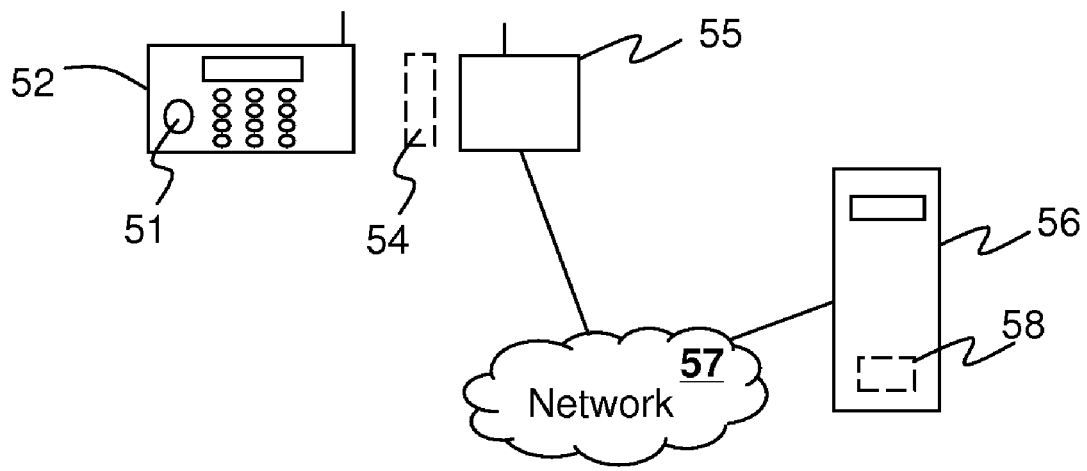
FIG. 3 is a block diagram of the system of FIG. 2 with the credit card media type removed from a wireless communication device in accordance with an embodiment of the present invention.

Referring to FIGS. 2 and 3, a system 50 is shown that can operate as outlined in the method 10 described above. The system 10 can include a credit card media type 54 integrated within a wireless communication device 52. The device 52 can be a cellular phone, a two-way radio, a smart phone, a laptop or personal digital assistant with wireless communication or any other mobile communication device. The device can further optionally include a biometric sensor or some other authentication device 51 that can further corroborate the authorize use of the credit card media type 54. The device 52 can communicate with a wireless transaction device 55 such as a point of sale credit card transaction reader that is coupled to a network 57 and server 56 as illustrated. As mentioned above, the system can operationally lower limits on payment authorizations when the credit card media type 54 is outside of the device 52 as shown in FIG. 3 or when the wireless communication device 52 is inoperable or otherwise unable to communicate with the network 57 or server 56 as shown in FIG. 2. The system 50 can also limit the item type purchased to critical or predefined types. For example, a user can purchase gas or groceries but can not go to a fancy jewelry store or department to purchase perfume or other non-essentials. Note that a default credit card media type can be defined when the card is removed from the device 52. Also note that the default credit card media type can be defined on a secure storage card such as a Subscriber Identity Module card or SIM card.

Electronic transactions within a mobile setting allows a credit card institution to leverage other authentication capabilities from the mobile device that are not inherently available on a standard issued credit card. For example, mobile devices exist with fingerprint identification that can also be used to provide an authorization on a credit card to make purchases above a predefined amount. Mobile devices such as cellular phones provide a greater ease of use for the individual. However, there are times where an electronic device through abnormal operation provides a hindrance to the user. One example is when the mobile device is damaged, loss of power or is submerged in water. All these examples render the mobile device non-operational and prevent the e-commerce transactions from taking place. Therefore, the method 10 and system 50 described above can enable a user to remove or eject a SIM card or secure storage card and enable limited use of the card outside of the mobile device. Alternatively, the card 54 can remain embedded and other technologies such as RFID can still enable transactions that can be similarly limited if desired.

Spending thresholds for the secure storage card or credit card media type can be set to predefined limits on the user's account when used outside of the mobile device or when the mobile device is inoperable or otherwise unable to communicate with a network. In addition to or alternatively, the item type that can be purchased can be restricted. The secure storage card type or credit card media type can adopt a particular profile as a default profile (that can be set by a financial institution and that can be defined within a user's profile). The device can optionally provide an indication of the default card type when outside of the mobile device. This can be done using an e-ink overlay that can be electronically altered after each use to the default card type.

Figure 4:
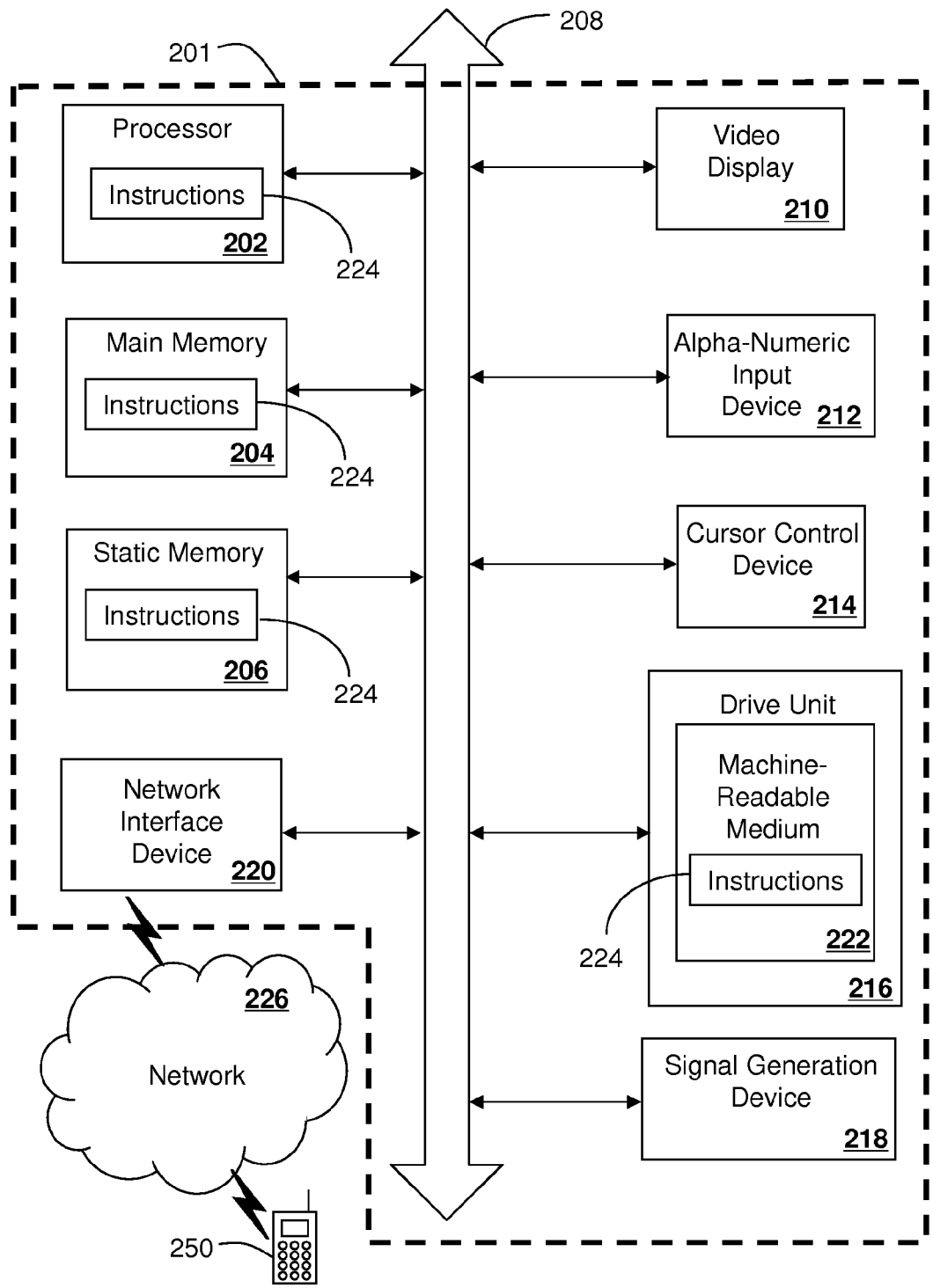
FIG. 4 is an illustration of another system using a credit card media type integrated with a wireless communication device in accordance with an embodiment of the present invention.

FIG. 4 depicts an exemplary diagrammatic representation of a machine in the form of a computer system 200 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. For example, the computer system can include a recipient device 201 and a sending device 250 or vice-versa.

The machine may comprise a server computer, a client user computer, a personal computer (PC), a tablet PC, personal digital assistant, a cellular phone, a laptop computer, a desktop computer, a control system, a network router, switch or bridge, or any machine capable of executing a set of instructions (sequential or otherwise) that specify actions to be taken by that machine, not to mention a mobile server. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 200 can include a controller or processor 202 (e.g., a central processing unit (CPU), a graphics processing unit (GPU, or both), a main memory 204 and a static memory 206, which communicate with each other via a bus 208. The computer system 200 may further include a presentation device such as a video display unit 210 (e.g., a liquid crystal display (LCD), a flat panel, a solid state display, or a cathode ray tube (CRT)). The computer system 200 may include an input device 212 (e.g., a keyboard), a cursor control device 214 (e.g., a mouse), a disk drive unit 216, a signal generation device 218 (e.g., a speaker or remote control that can also serve as a presentation device) and a network interface device 220. Of course, in the embodiments disclosed, many of these items are optional.

The disk drive unit 216 may include a machine-readable medium 222 on which is stored one or more sets of instructions (e.g., software 224) embodying any one or more of the methodologies or functions described herein, including those methods illustrated above. The instructions 224 may also reside, completely or at least partially, within the main memory 204, the static memory 206, and/or within the processor 202 during execution thereof by the computer system 200. The main memory 204 and the processor 202 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but are not limited to, distributed processing or component/object distributed processing, parallel processing, or virtual machine processing can also be constructed to implement the methods described herein. Further note, implementations can also include neural network implementations, and ad hoc or mesh network implementations between communication devices.

The present disclosure contemplates a machine readable medium containing instructions 224, or that which receives and executes instructions 224 from a propagated signal so that a device connected to a network environment 226 can send or receive voice, video or data, and to communicate over the network 226 using the instructions 224. The instructions 224 may further be transmitted or received over a network 226 via the network interface device 220.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein. Further note, the embodiments are not necessarily limited to song files, but can also include video files or multimedia files that can have a pace or tempo associated with such files.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method of using a credit card media type integrated with a wireless communication device having a processor operatively coupled thereto, comprising the steps at the processor of:
   determining that the wireless communication device is inoperable for use in a commercial transaction; and
   enabling the use and authorization of the credit card media type with a predetermined restriction profile that is more restrictive than when the credit card media type is used with the wireless communication device when operable.

2. The method of claim 1, wherein the method further comprises the step of lowering the payment authorization amount based on a remote network being unable to communicate with the wireless communication device.

3. The method of claim 1, wherein the method further comprises the step of limiting a type of item that is purchased to a predefined type based on a remote network being unable to communicate with the wireless communication device.

4. The method of claim 1, wherein the method further comprises the step of removing the credit card media type from the wireless communication device and enabling the use and authorization of the credit card media type with the predetermined restriction profile.

5. The method of claim 1, wherein a default card type is defined when the credit card media is ejected from the wireless communication device.

6. The method of claim 1, wherein a default card type is defined when a remote network is unable to communicate with the wireless communication device.

7. The method of claim 6, wherein the default card type is defined on a secure storage card stored within the wireless communication device.

8. A system of managing a credit card media type integrated with a wireless communication device, comprising:
   a wireless transceiver;
   a credit card media type; and
   a processor operatively coupled to the wireless transceiver and the credit card type, wherein the processor is programmed to:
      determine when the wireless transceiver is inoperable for use in a commercial transaction; and
      enable the use and authorization of the credit card media type with a more restrictive usage authorization than when the credit card media type is used in conjunction with an operable wireless communication device that can communicate with a wireless network.

9. The system of claim 8, wherein the processor is further programmed to lower the payment authorization amount based on a remote network being unable to communicate with the wireless communication device.

10. The system of claim 8, wherein the processor if further programmed to limit a type of item that is purchased to a predefined type based on a remote network being unable to communicate with the wireless communication device.

11. The system of claim 8, wherein the credit card media type can be removed from the wireless communication device.

12. The system of claim 11, wherein a default card type is defined when the credit card media is ejected from the wireless communication device.

13. The system of claim 9, wherein a default card type is defined when a remote network is unable to communicate with the wireless communication device.

14. The system of claim 13, wherein the default card type is defined on a secure storage card stored within the wireless communication device.

15. The system of claim 8, wherein wireless communication device is a cellular phone, a smart phone, or a personal digital assistant or a laptop computer with wireless communication capabilities.

16. A portable wireless communication device, comprising:
   a wireless transceiver;
   a removable credit card media type integrated within the portable wireless communication device; and
   wherein the removable credit card media type is authorized for financial transactions for a less restrictive authorization mode when the wireless transceiver communicates with a remote network and is authorized for a more restrictive mode when the wireless transceiver fails to communicate with the remote network.

17. The portable wireless communication device of claim 16, wherein the portable wireless communication device further comprises a processor operatively coupled to the wireless transceiver and the credit card type wherein the processor is programmed to determine when the wireless transceiver is inoperable for use in a commercial transaction and enable the use and authorization of the credit card media type with the more restrictive authorization mode when the wireless transceiver is determined inoperable.

18. The portable wireless communication device of claim 16, wherein a default card type is defined when the removable credit card media is ejected from the wireless communication device.

19. The portable wireless communication device of claim 16, wherein a default card type is defined when the remote network is unable to communicate with the wireless communication device.

20. The portable wireless communication device of claim 16, wherein portable wireless communication device is a cellular phone, a smart phone, or a personal digital assistant or a laptop computer with wireless communication capabilities.

* * * * *